Oct. 24, 1933. C. T. PFLUEGER 1,932,353
DISPLAY PACKAGE AND CONTAINER FOR BAIT
Filed July 17, 1931

INVENTOR
CHARLES T. PFLUEGER
BY
ATTORNEYS

Patented Oct. 24, 1933

1,932,353

UNITED STATES PATENT OFFICE 1,932,353

DISPLAY PACKAGE AND CONTAINER FOR BAIT

Charles T. Pflueger, Akron, Ohio, assignor to The Enterprise Manufacturing Company, Akron, Ohio, a corporation of Ohio Application July 17, 1931. Serial No. 551,347

5 Claims. (Cl. 206—46)

This invention relates to display package and containers for bait, and more especially it relates to transparent containers for fish bait, for example, a lure including a hook or hooks.

The chief objects of the invention are to provide a receptacle for bait of the character mentioned which conveniently may be carried in the pocket; to prevent rattling of the bait within the container; to provide a bait receptacle which may be used as a display package for the bait; to provide for keeping the bait fixedly in position within the package; to provide conveniently for the display of advertising matter within the package; and to keep bait comprising metal lures from tarnishing.

Figure 1:
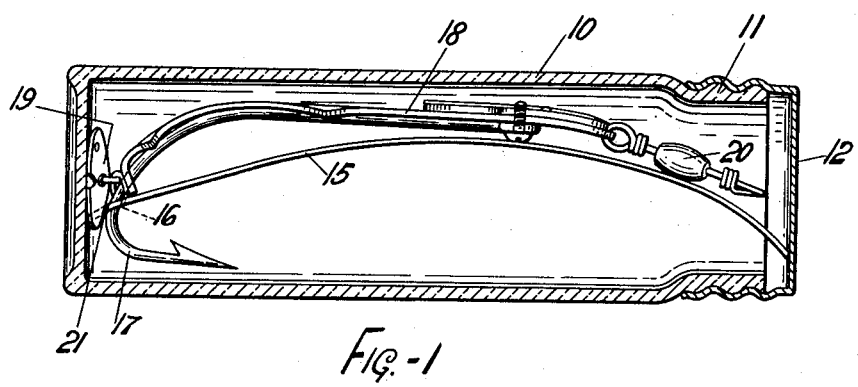
Figure 1 is a longitudinal section of a container, and the bait and mount therefor in elevation therein, the assembly constituting the improved display package.
Figure 2:
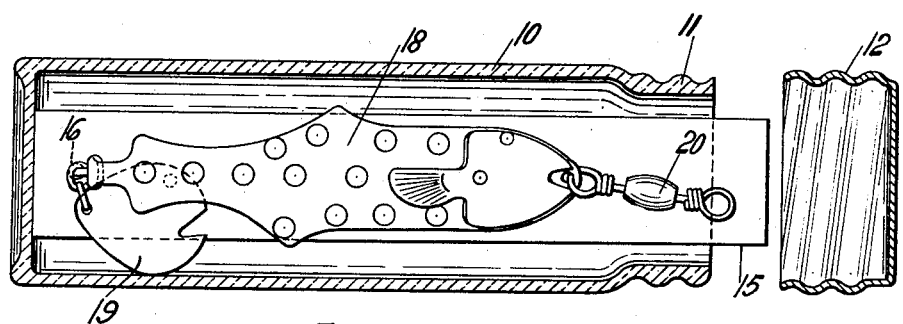
Figure 2 is a view similar to Figure 1 at right angles thereto, the cap of the container being removed.
Figure 3:
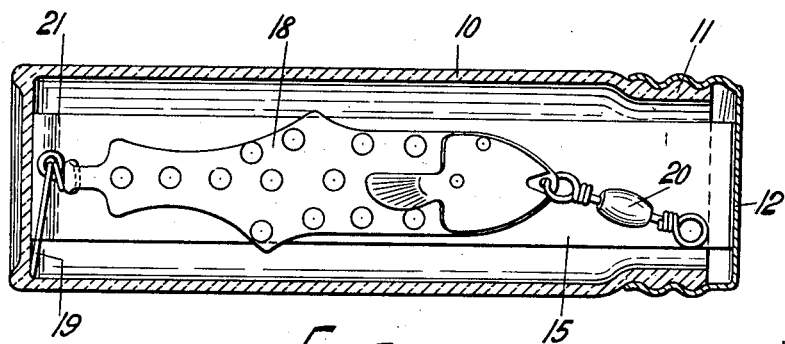
Figure 3 is a view similar to Figure 2 with the cap in place upon the container.

Referring to the drawing, the improved display package comprises a transparent container or receptacle 10, preferably of glass and having one closed end, and at the other end a threaded neck 11, and a metal cap 12 threaded onto the latter. Interiorly of the container 10 is a strip of cardboard or similar flexible material 15 that normally is longer than the container so as to project from the open end thereof when the cap is removed as is most clearly shown in Figure 2. Adjacent one end the strip 15 is formed with an aperture 16, Figure 1, through which may be passed a fishhook 17, and said fishhook may be a part of a lure 18 including a wobbler 19 and swivel attaching link 20.

When the flexible strip 15 with fishhook or lure or both mounted thereon is placed within the container 10 and the cap 12 mounted thereon, the strip 15 will flex as indicated at 21, and become bowed or concavo-convex in shape with the lure 18 on the convex side thereof, the strip constituting a background for the attractive display of the lure. The result is that the bowed strip 15 either forces the lure against the interior surface of the container, or at least confines it in such a small space that little or no movement of the lure with relation to the container or strip 15 is possible, and said strip is held by the cap against relative movement in the container.

If desired, appropriate informative or advertising matter may be printed upon the strip 15, on the concave side thereof, and such matter will be visible through the container. Since there is no relative movement of the article in the container after the cap is screwed thereon, it will be seen that the assembly constitutes a display package which may be suitably mounted or otherwise arranged for display, the articles always retaining their original positions in the containers.

Various articles may be mounted on the flexible strip in the container, and the invention accomplishes the several objects set forth in the foregoing statement of objects.

After the bait has been used, the bottle or container constitutes a convenient means for carrying the bait in the pocket, protecting the hook, and preventing its entanglement in the pocket or tackle-box of the fisherman. It also serves to preserve the finish on the bait.

Modifications may be resorted to within the scope of the appended claims which are not limited wholly to the specific construction shown and described.

What is claimed is:

1. In a device of the character described, the combination of a transparent container including a closure therefor, a flexible display card in the container, said card being longer than the container and flexed by operation of the closure, and an article on the convex side of the card and urged by the latter, from behind, toward the wall of the container.

2. A device of the character described comprising a tubular container open at one end, a closure for said open end, a strip of flexible material in said container, said strip being of such length as to be placed under longitudinal compression and bowed by pressure of the closure when the latter is mounted upon the container, and an article of merchandise mounted upon the convex side of the strip.

3. In a device of the character described, the combination of a container including a closure therefor, and a strip of flexible material therein of greater length than the container, said strip being bowed when the closure is applied to the container, and a fish lure or the like mounted on the convex side of the strip.

4. In a device of the character described, the combination of a transparent container including a closure therefor, and a strip of flexible material supporting an article of merchandise comprising means for mounting an article thereon, said strip having greater length than the container so as to be bowed when the closure is applied to the container, with the article on the convex side of the bow so as to be urged by the strip, from behind, toward the wall of the container.

5. In a device of the character described, the combination of a transparent container, a strip of flexible material in the container, an article of merchandise carried on the strip, the strip being held in position in the container by distortion of the strip in assembling it within the container, the article being positioned on the convex side of the strip and thereby urged by the strip, from behind, toward the wall of the container.

CHARLES T. PFLUEGER.